(12) United States Patent
Beck

(10) Patent No.: US 6,519,131 B1
(45) Date of Patent: Feb. 11, 2003

(54) ELECTRIC CATTLE GUARD

(76) Inventor: Herbert W. Beck, 2519 Oak Ridge Dr., Farmington, MO (US) 63640

( * ) Notice: Subject to any disclaimer, the term of this patent is extended or adjusted under 35 U.S.C. 154(b) by 310 days.

(21) Appl. No.: 09/624,273

(22) Filed: Jul. 24, 2000

(51) Int. Cl.[7] .................................................. H05F 3/02
(52) U.S. Cl. ............................. 361/232; 49/59; 52/101
(58) Field of Search ........................... 361/232; 256/10, 256/23; 43/98; 49/34, 59, 70, 131; 52/101

(56) References Cited

U.S. PATENT DOCUMENTS

| | | |
|---|---|---|
| 520,510 A | 5/1894 | Wilson |
| 909,814 A | 1/1909 | Norris |
| 1,165,485 A | 12/1915 | Adams |
| 2,476,233 A | 7/1949 | Wood ........................ 256/10 |
| 2,512,740 A | 6/1950 | Evans ........................ 256/10 |
| 2,555,180 A | 5/1951 | Adkins ...................... 256/10 |
| 2,633,337 A | 3/1953 | Nieuwenhuis .............. 256/10 |
| 2,899,174 A | 8/1959 | Wells ......................... 256/10 |
| 3,392,247 A | 7/1968 | Check ........................ 200/86 |
| 3,455,279 A | 7/1969 | Krevit ........................ 119/28 |
| 3,756,566 A | 9/1973 | Bangs ........................ 256/10 |
| 3,821,500 A | 6/1974 | Newman .................. 288/86 R |
| 4,274,123 A | 6/1981 | Rogers, Jr. ................ 361/232 |
| 4,708,322 A | 11/1987 | Ratcliffe ...................... 256/10 |
| 4,756,116 A | 7/1988 | Cutter ........................ 43/108 |
| 4,949,216 A | 8/1990 | Djukastein ................ 361/232 |
| 4,969,418 A | 11/1990 | Jones .......................... 119/29 |
| 5,072,915 A | 12/1991 | Shirley ....................... 256/14 |
| 5,107,620 A | 4/1992 | Mahan ........................ 43/112 |
| 5,158,039 A | 10/1992 | Clark ......................... 119/29 |
| 5,203,542 A | 4/1993 | Coley et al. ................ 256/10 |
| 5,269,091 A | 12/1993 | Johnson et al. ............. 43/98 |
| 5,338,007 A | 8/1994 | Hinton ....................... 256/48 |
| 6,053,126 A * | 4/2000 | Klinger ..................... 119/526 |

* cited by examiner

*Primary Examiner*—Adolf Deneke Berhane
(74) *Attorney, Agent, or Firm*—Grace J. Fishel

(57) ABSTRACT

An electric cattle guard formed of first and second elongated mats, said second mat received in an upper face of the first mat. Both mats are formed of a flexible insulating material with the second mat interspersed with electrically conductive particles, fibers or a mixture thereof in an amount sufficient to apply a high voltage, low energy shock to an animal making contact with the second elongated mat when it energized. A conductive strip adapted to make electrical contact with an electric fence energizer is provided at one or both ends of the second elongated mat.

15 Claims, 2 Drawing Sheets

ELECTRIC CATTLE GUARD

BACKGROUND OF THE INVENTION

1. Field of the Invention

The present invention relates to a portable electric cattle guard.

2. Brief Description of the Prior Art

Cattle guards function both as a gate and fence, keeping livestock from crossing, but allowing automobiles, tractors and the like to pass freely. Such guards are designed to do away with the inconvenience of having to get out of the vehicle and physically open and close a gate. They also prevent livestock from escaping where the gate is not properly closed, either accidentally or negligently.

In its earliest form, cattle guards were made from wooden poles or logs which were spaced in parallel fashion over a pit in the roadway. Modern cattle guards are made with metal bars set in a concrete frame. They are permanent structures and have the disadvantage that they cannot be easily relocated if the guard is needed in some other location.

After electric fences came into common use, the portability problem was addressed by proposing an electric cattle guard. Some of these cattle guards include an electrified metallic frame suspended over a base (U.S. Pat. No. 2,800,304 to Van Alsburg). The frame is insulated from the base and spring biased such that a vehicle can drive over it. A variant on this design makes use of wires instead of bars, rendering the device, while still cumbersome and heavy, slightly more portable (U.S. Pat. No. 5,072,915 to Shirley). Others have tried embedding a grid of conductive wires into a rubber mat (U.S. Pat. No. 2,555,180 to Adkins). This idea sounds good except, based on applicant's experience, the wires stiffen the mat such that it cannot be rolled up and tend to break out of the mat as they must be only partly embedded to shock an animal.

BRIEF SUMMARY OF THE INVENTION

In view of the above, it is an object of the present invention to provide an electric cattle guard formed of a flexible material that can be rolled for transport. It is another object to provide an electric cattle guard that is not damaged when it is rolled. Other objects and features of the invention will be in part apparent and in part pointed out hereinafter.

In accordance with the invention, an electric cattle guard is formed from a first and second elongated mat. The first elongated mat is formed of a flexible insulating material and has an upper and a lower face. A recess is provided in the upper face of the first elongated mat within which is framed the second elongated mat.

The second elongated mat is adapted to substantially span a gate opening and is formed of a flexible insulating material interspersed with a plurality of electrically conductive particles, fibers or a mixture thereof. The electrically conductive materials are provided in an amount sufficient to apply a high voltage, low energy shock to an animal making contact with the second elongated mat when it is energized. For this purpose the second elongated mat has an electrically conductive strip at one or both ends, said strip adapted to make electrical contact with an electric fence energizer.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
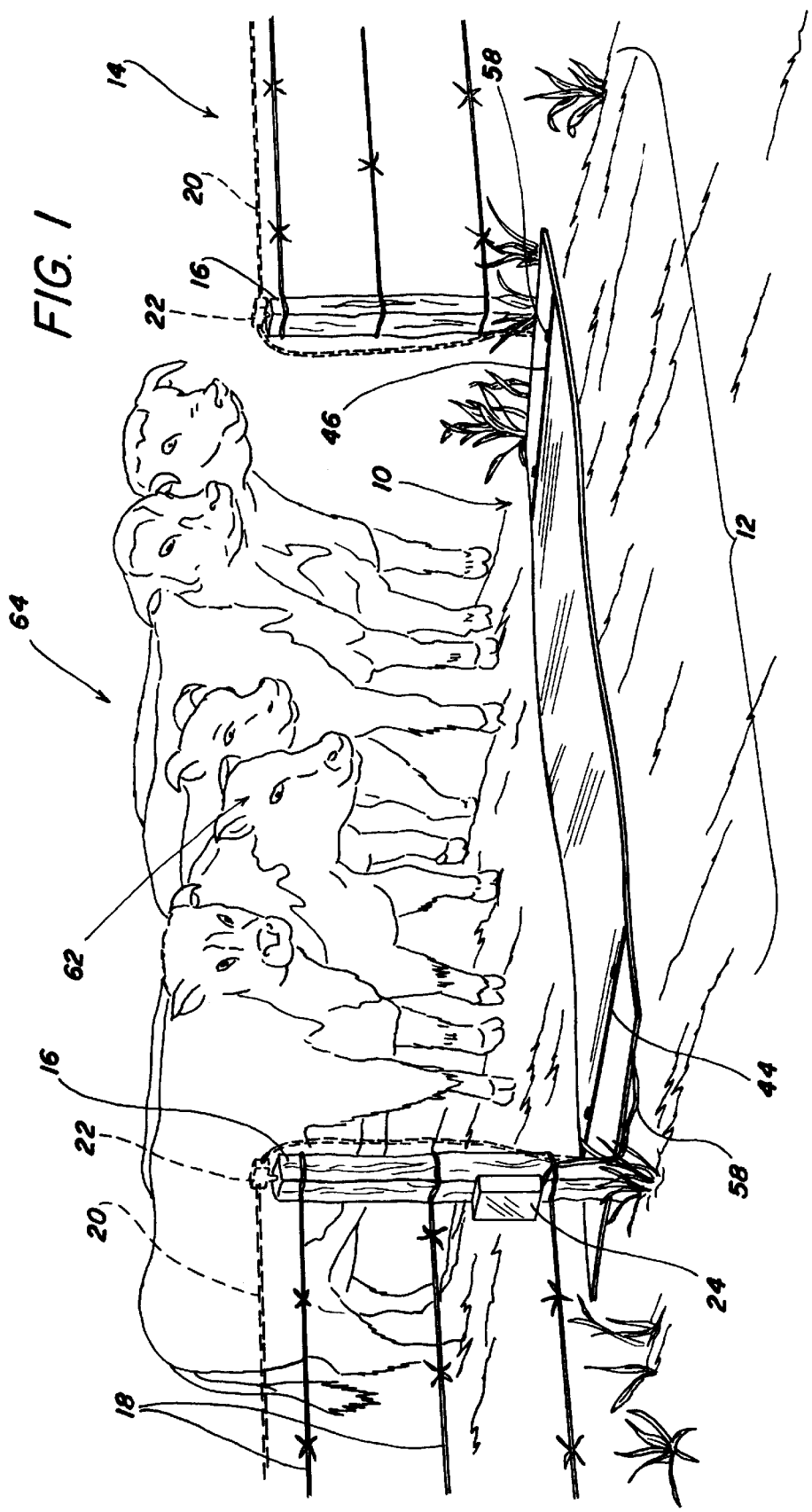
FIG. 1 is a perspective view of an electric cattle guard in accordance with the present invention shown installed in a gate opening.

Referring to the drawings more particularly by reference character, reference numeral 10 refers to an electric cattle guard in accordance with the present invention. It will be understood that while the product is called a cattle guard, its use is not limited to cattle. Cattle guard 10 may be used in some instances with other livestock such as hogs, sheep, horses and so forth.

Cattle guard 10 is designed for use in a gate opening 12 for example in a fence line 14. As illustrated in FIG. 1, fence line 14 includes a plurality of spaced apart fence posts 16 on which one or more strands 18 of barbed wire may be strung. It will be understood that fence posts 16 may be joined with other fence building materials such as wooden panels, wire mesh, etc. and that fence line 14 may include one or more electric wires 20, set on insulators 22, as shown in broken lines. While cattle guard 10 is particularly useful for a gate opening in a fence line, it may be used in other gate openings such as a doorway of a barn, loading pen, etc.

Cattle guard 10 is powered with an electric fence energizer 24 which converts main, battery, solar or the like power into a high voltage, typically pulsed. Usually the pulses are short and at spaced intervals to conserve power, with a pulse about 150 microseconds long, once every second, being representative. When fence line 14 includes an electric wire 20, electric fence energizer 24 may be located some distance from cattle guard 10. If fence line 14 does not include an electric wire 20, electric fence energizer 24 may be mounted adjacent gate opening 12 on one of posts 16 as shown in FIG. 1.

Figure 2:
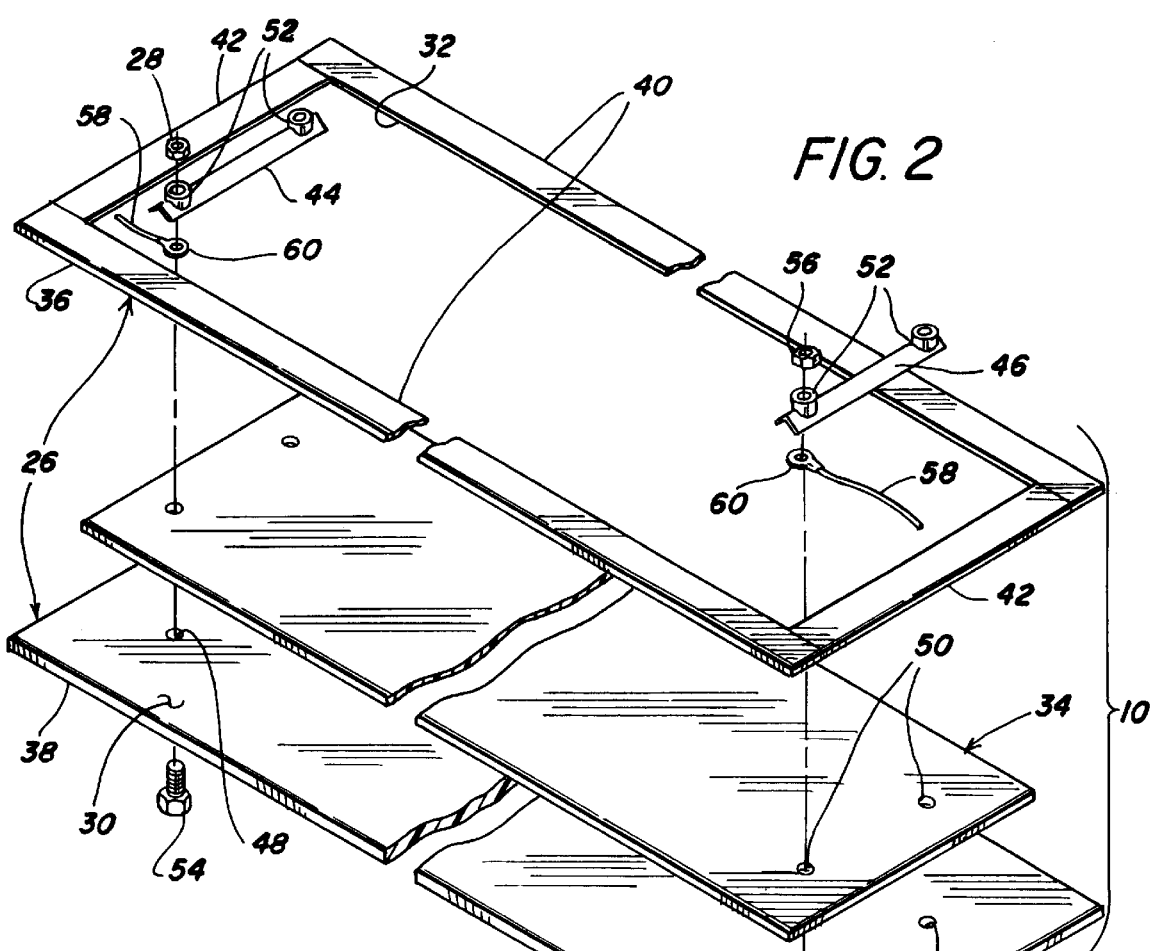
FIG. 2 is an exploded perspective view of the cattle guard.
Figure 3:
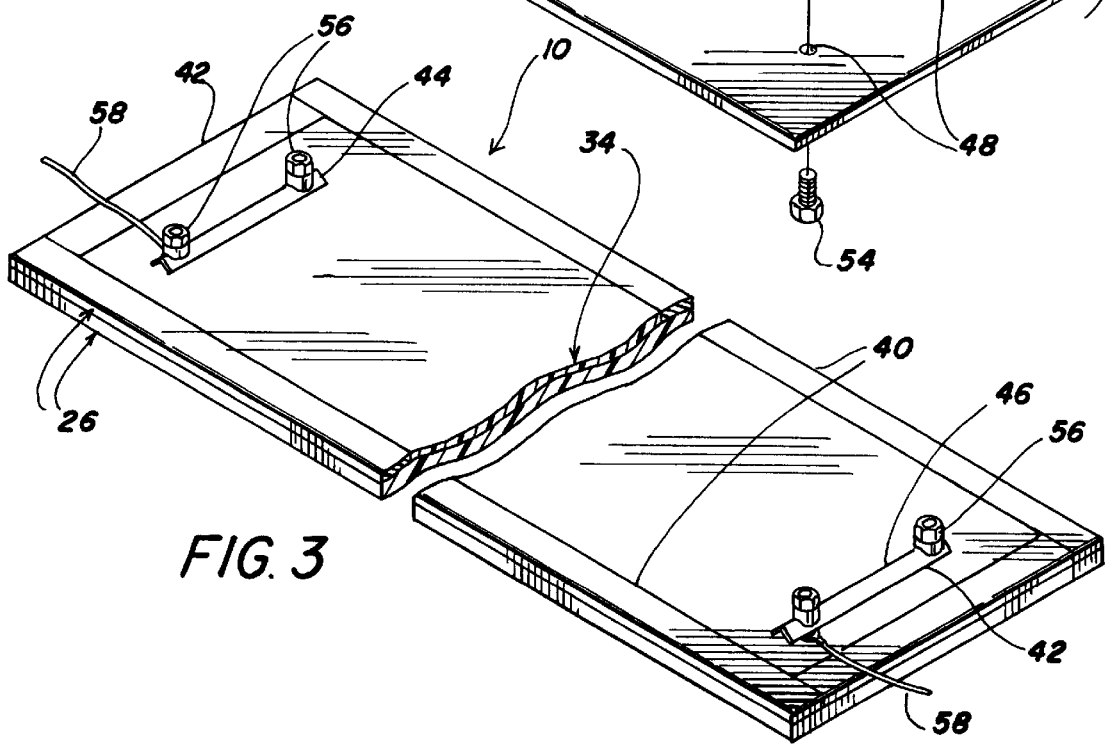
FIG. 3 is an assembled perspective view of the cattle guard.

Turning to FIGS. 2–3, cattle guard 10 is of sandwich construction with a first elongated mat 26 having an upper 28 and a lower face 30. A recess 32 is provided in upper face 28 within which is framed a second elongated mat 34. Recess 32 in first elongated mat 26 may be formed by stacking upper and lower sheets 36, 38 respectively, with upper sheet 36 serving as a frame for second elongated mat 34. To conserve material, upper sheet or frame 36 is preferably formed from two long strips 40 joined by two shorter strips 42.

Second elongated mat 34 has a length such that it spans gate opening 12 and preferably has a width such that a cow cannot easily step over. For this purpose, cattle guard 10 may be offered in various lengths such as 12, 14 and 16 feet and is preferably about 4 feet wide with frame 36 providing a border about 2½ inches wide. It will be understood that the invention is not limited to these particulars, they being provided by way of illustration.

First elongated mat 26, composed of lower sheet 38 and frame 36, is formed of a flexible insulating material. Suitable flexible materials include natural and synthetic rubbers. As described in Example 1, polychloroprene rubber has been found satisfactory, but other synthetic rubbers may be used. Possible candidates include isoprene rubber, epichlorohydrin rubber, urethane rubber, silicone rubber, acrylic rubber, acrylonitrol-butadiene-styrene rubber and the like, and blends thereof.

Second elongated mat 34 is also formed of a flexible insulating material as described above but additionally includes, interspersed therein, a plurality of electrically conductive particles, fibers or a mixture thereof. Extra conductive carbon black which usually is provided as porous or hollow particles is suitable. Other conductivizing agents, provided as powders or short fibers and suitably mixed in, may also be explored such as graphite, metals such as aluminum, copper, nickel, tin or stainless steel, and other alloys and suitably conductive compounds.

The conductivizing agent must be present in second elongated mat 34 in an amount sufficient to apply a high voltage, low energy shock to an animal making contact therewith when cattle guard 10 is charged with electric fence energizer 24. For this purpose, it has been found that second elongated mat 34 should have an ohm resistance, along the full length thereof, of less than about 20,000 ohms, preferably less than about 10,000 ohms and most preferably less than about 6,000 ohms. A resistance of 30,000 ohms has been found too great to apply the necessary shock.

First and second elongated mats 26, 34 when formed of polychloroprene or the like are preferably co-vulcanized in a press such that the mats are seamlessly fused together. As will be readily understood by those having skill in the art of rubber formulation, various commonly used additive materials such as, for example, curing aids, such as sulfur, activators, retarders and accelerators, processing additives, such as oils, resins including tackifying resins, silicas, and plasticizers, fillers, pigments, fatty acids, zinc oxides, waxes, antioxidants and antiozonants, peptizing agents and the like may be added to the rubber in conventional amounts insofar as consistent with first elongated mat 26 being insulative and second elongated mat 34 being conductive. An illustrative formulation with polychloroprene is provided in Example 1. It is also contemplated that mats 26, 34, may be fused together with a solvent, glued or otherwise joined if vulcanized separately.

An electrically conductive strip 44 is provided at one end of second elongated mat 34, when cattle guard 10 is at the end of an open circuit, and a second electrically conductive strip 46 at the other end when cattle guard 10 is inserted into an electric fence. Conductive strip(s) 44, 46 may be embedded in second elongated mat 34 before the rubber is cured or attached to cattle guard 10 after first and second elongated mats 26, 34 are joined. As shown in FIGS. 2–3, conductive strip(s) 44, 46 may be an angle iron, preferably formed of rust resistant stainless steel. A pair of holes 48, 50 are drilled through first and second elongated mats 26, 34, respectively, in registry with a pair of holes 52 in conductive strip(s) 44, 46. Non-conductive bolts 54, made of a plastic material such as nylon, are passed from lower face 30 of first elongated mat 26, through second elongated mat 34 and conductive strip(s) 44, 46 and are secured with nuts 56.

An electric wire 58 for making electrical contact between energizer 24 or electric wire 20 and second elongated mat 34, illustrated as terminating with an eye 60, is threaded on one of bolts 54 between conductive strip(s) 44, 46 and second elongated mat 34. Electric wire 58 is connected to electric fence energizer 24 at one end of cattle guard 10 as shown in FIG. 1 or both ends of cattle guard 10 are connected with electric wires 58 when cattle guard 10 is inserted into an electric fence.

In use, cattle guard 10 is positioned in gate opening 12 and conductive strip(s) 44, 46 are connected with wire(s) 58 to electric fence energizer 24 or electric wire 20. When an inexperienced animal, such as a cow 62 in a herd 64 as shown in FIG. 1, approaches cattle guard 10, it may sniff the cattle guard out of curiosity. As its nose advances towards second elongated mat 34, a spark will jump, startling the animal and possibly the accompanying herd 64. If the animal does not sniff cattle guard 10, when it steps on second elongated mat 34, a shock will be sent through its body, the natural reaction to which is to draw back suddenly. Even though the voltage is high and the shock is painful, the current is low such that the animal will not be harmed.

A cattle guard 10 about four feet wide, as above mentioned, is sufficient to serve as an effective barrier for cattle, sheep, hogs and the like. Horses, on the other hand, could jump a four-foot wide cattle guard and elongated mats 26, 34 must therefore be made wider for their confinement.

When cattle guard 10 is no longer needed in gate opening 12, it can be disconnected from wire(s) 58, rolled up and stored or taken to another location for use. Since the conductivizing agent in second elongated mat 34 are finely divided particles and fibers, they stay embedded in the mat, unlike the wires used in U.S. Pat. No. 2,555,180 to Adkins. Cattle guard 10 is thus both portable and durable.

The following example illustrates the invention.

EXAMPLE 1

A cattle guard 10 in accordance with the present invention was prepared as follows:

A sheet of uncured rubber ¼ inch thick, 14 feet long and four feet wide for lower sheet 38 and strips ⅛ inch thick and 2½ inches wide for frame 36 were prepared from the composition shown in Table I below for first elongated mat 26.

TABLE I

|  | Phr[1] |
|---|---|
| Neoprene GN[2] | 86.67 |
| Neoprene W[3] | 13.33 |

[1]The term Phr refers to parts of the respective material per 100 parts by weight of rubber
[2]A polychloroprene sold by E. I. du Pont de Nemours and Company
[3]A polychloroprene sold by E. I. du Pont de Nemours and Company A sheet of uncured rubber ⅛ inch thick, 13 feet and 7 inches long by 3 feet and 7 inches wide was prepared from the composition shown in Table II below for second elongated mat 34.

TABLE II

|  | Phr | Percent by Weight |
|---|---|---|
| Neoprene GN | 86.67 | 50.97 |
| Neoprene W | 13.33 | 7.84 |
| Vulcan XC-72[4] | 40.00 | 23.53 |
| Petrolatum DLC(PET)72[5] | 2.03 | 1.19 |
| Stan Mag Bars[6] | 6.03 | 3.55 |
| Standard ODP[7] | 2.03 | 1.19 |
| Zinc oxide | 4.00 | 2.35 |
| DOP[8] | 11.60 | 6.82 |
| Stearic acid | 1.74 | 1.03 |
| Structol WB-222(WB-212)[9] | 2.60 | 1.53 |
|  | 170.03 | 100.00 |

[4]An extra conductive carbon black sold by Cabot Corporation
[5]A plasticizer
[6]A curing agent
[7]ODP is a retardant
[8]DOP is di-octyl-phthalate, a plasticizer
[9]A dispersing agent First and second elongated mats 26, 34 were layered and vulcanized in a press under conditions generally known in the rubber belt making art. After about 20 minutes at a temperature of about 300° F., mats 26, 34 were fused such that the seams between them were imperceptible. Holes 48, 50 were then drilled and conductive strips 44, 46 formed of 1×1 inch stainless steel angle iron, 18 inches long were installed with nylon bolts 54 and secured with nuts 56. Cattle guard 10 was then rolled for storage and ready for transport to a location requiring a gate.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An electric cattle guard comprising a first elongated mat formed of a flexible insulating material, said first elongated mat having an upper and a lower face with a recess in the upper face within which is framed a second elongated mat, said second elongated mat adapted to substantially span a gate opening, said second elongated mat formed of a flexible insulating material interspersed with a conductivizing agent comprising a plurality of electrically conductive particles, fibers or a mixture thereof in an amount sufficient to apply a high voltage, low energy shock to an animal making contact therewith when the second elongated mat is energized, said second elongated mat having an electrically conductive strip at one end, said strip adapted to make electrical contact with an electric fence energizer.

2. The cattle guard of claim 1 wherein the first and second elongated mats are formed of rubber and the electrically conductive particles are carbon black.

3. The cattle guard of claim 1 wherein the flexible insulating material is polychloroprene.

4. The cattle guard of claim 1 wherein the conductivizing agent is present in an amount that the second elongated mat has an ohm resistance less than about 20,000 ohms along the length thereof.

5. The cattle guard of claim 1 wherein the conductivizing agent is present in an amount that the second elongated mat has an ohm resistance less than about 10,000 ohms along the length thereof.

6. The cattle guard of claim 1 wherein the conductivizing agent is present in an amount that the second elongated mat has an ohm resistance less than about 6,000 ohms along the length thereof.

7. An electric cattle guard comprising a first elongated mat formed of a flexible polychloroprene rubber, said first elongated mat having an upper and a lower face with a recess in the upper face within which is framed a second elongated mat, said second elongated mat adapted to substantially span a gate opening, said second elongated mat formed of a flexible polychloroprene rubber interspersed with conductive carbon black particles in an amount sufficient to apply a high voltage, low energy shock to an animal making contact therewith when the second elongated mat is energized, said second elongated mat having an electrically conductive strip at one end, said strip adapted to make electrical contact with an electric fence energizer.

8. The cattle guard of claim 7 wherein the carbon black is present in an amount that the second elongated mat has an ohm resistance less than about 20,000 ohms along the length thereof.

9. The cattle guard of claim 7 wherein the carbon black is present in an amount that the second elongated mat has an ohm resistance less than about 10,000 ohms along the length thereof.

10. The cattle guard of claim 7 wherein the carbon black is present in an amount that the second elongated mat has an ohm resistance less than about 6,000 ohms along the length thereof.

11. An electric cattle guard comprising co-vulcanized first and second elongated mats, said first elongated mat formed of a flexible polychloroprene rubber and constructed of a lower sheet and an upper sheet forming a frame within which is framed said second elongated mat, said second elongated mat adapted to substantially span a gate opening, said second elongated mat formed of a flexible polychloroprene rubber interspersed with conductive carbon black particles in an amount sufficient to apply a high voltage, low energy shock to an animal making contact therewith when the second elongated mat is energized, and said second elongated mat having an electrically conductive strip at one end attached after said first and second elongated mats are co-vulcanized, said strip adapted to make electrical contact with an electric fence energizer.

12. The cattle guard of claim 11 wherein the first sheet is about ¼ inch thick and the frame and second elongated mat is about ⅛ inch thick.

13. The cattle guard of claim 11 wherein the carbon black is present in an amount that the second elongated mat has an ohm resistance less than about 20,000 ohms along the length thereof.

14. The cattle guard of claim 11 wherein the carbon black is present in an amount that the second elongated mat has an ohm resistance less than about 10,000 ohms along the length thereof.

15. The cattle guard of claim 11 wherein the carbon black is present in an amount that the second elongated mat has an ohm resistance less than about 6,000 ohms along the length thereof.

\* \* \* \* \*